United States Patent Office 3,830,783
Patented Aug. 20, 1974

3,830,783
PROCESS FOR THE PREPARATION OF RESINS FROM UREA, FORMALDEHYDE, METHANOL AND FORMIC ACID USING THREE STAGES
Silvio Vargiu, Sesto S. Giovanni, Giorgio Mazzoleni, and Ugo Nistri, Milan, Italy, assignors to Societa Italiana Resine S.I.R. S.p.A., Milan, Italy
No Drawing. Filed Dec. 27, 1972, Ser. No. 318,792
Claims priority, application Italy, Dec. 27, 1971, 32,958/71
Int. Cl. C08g 9/34
U.S. Cl. 260—70 A                                    6 Claims

ABSTRACT OF THE DISCLOSURE

Urea formaldehyde resins of controllably variable properties, particularly for chipboard and plywood, are made in a process which comprises an initial stage of polymerisation reaction which is carried out at a basic pH and with high ratios of formaldehyde to urea, a second stage of reaction in which the product originating from the first stage is maintained at a relatively acid pH for a short period of time and a third stage of reaction in which a weakly acid pH is maintained, with low ratios of formaldehyde to urea, and is essentially characterised by the fact that methanol is added to the first or to the second stage of reaction or to both stages of reaction, in quantities of 2 to 12% by weight with respect to the total reaction mass which is discharged at the final stage of the process.

The present invention relates to an improved process for the preparation of resins from urea and formaldehyde.

More particularly, the invention relates to the preparation, by a continuous process, of resins from urea and formaldehyde, having high chemico-physical properties, and suitable particularly for the manufactured goods of the chipboard and plywood panel type.

As is known in industry, resins are prepared from urea and formaldehyde by a process which consists essentially in bringing the reagents into contact in a first reaction stage to cause a reaction of addition under the influence of alkaline catalysts. Then, in a second stage, a real condensation reaction takes place, with liberation of water in the reaction medium and an increase in the molecular weight of the resin.

In the production of resin from urea and formaldehyde, many difficulties are encountered in regulation of the characteristic features of the resins themselves, particularly where considerable reaction volumes are concerned. Thus, with a variation in the conditions of working, there is a variation not only in the viscosity, molecular weight and distribution of molecular weight, but also in the structural characteristics of the actual resin.

Therefore, various processes have been suggested which are suitable for influencing those properties of urea and formaldehyde resins such as mean molecular weight, distribution of molecular weight and structure, with which are more closely linked the fundamental parameters such as stability, dispersibility and adhesive properties of the resin.

In particular, one seeks in such processes, be they continuous or intermittent, those conditions of reaction which make it possible to enhance the desirable characteristics of the finished product.

Thus, for example, it has been found possible to enhance one or other of the desirable requisites of resins by varying the molar ratio of formaldehyde to urea or by dispensing the urea in several stages during preparation of the resin.

However, the factors in favour of one characteristic of the resin almost always have a negative influence on one or more of the other characteristics of the resin.

For example, when the molar ratio of formaldehyde to urea is reduced, there is the advantage of a reduction of free formaldehyde in the resin, but at the same time there is a lessening of the stability of the resin itself, in addition to an increase in the setting times due to the action of the hardeners normally used for the purpose.

Furthermore, the resins obtained in the processes in which all the urea is added to the formaldehyde at the same stage of reaction have, compared with resins in which the urea is added in several stages, a shorter setting time, but also a lower stability and an excessively high content of free formaldehyde.

In addition, attempts have been made to influence the structural characteristics of urea formaldehyde resins by varying the parameters of the reaction such as times, temperatures and pH of the medium, or by introducing particular arrangements in the process for preparing the resins. As has been demonstrated by several researchers, according to the conditions of working, so it is possible to bring out in the resin one or other of the two following structures:

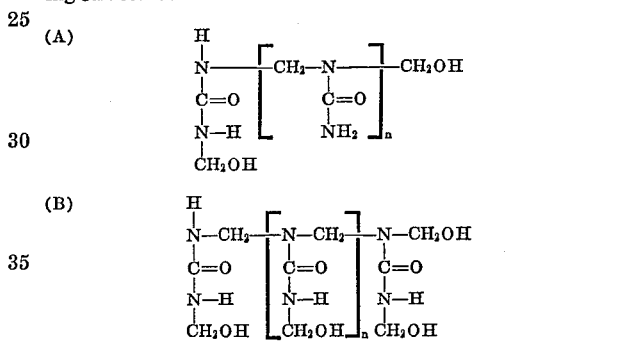

With the increase in the degree of polymerisation "n" in structure A, there is a decrease in the degree of miscibility of the resin with water and an increase in the tendency towards sedimentation of the resin itself when dispersed in water. Furthermore, the time within which the resin hardens under the action of ammonium chloride tends to increase.

With an increase in the degree of polymerisation "n" in structure B, there is an increase in the degree of miscibility of the resin with water, while its stability over a period of time is increased and the hardening times are decreased. To ensure a positive balance of the technological properties, the said two forms have to coexist in one and the same resin.

However, in the production of chipboard panels or other manufactured goods, an important feature is the degree of penetration of the resin into the capillaries of the wood and this degree of penetration is markely dependent upon the structural characteristics of the resin insofar as it is linked to the quantity of methylol —CH$_2$OH groups in the resin itself.

Therefore, in the production of resins from urea and formaldehyde, it is desirable on the one hand to have highly stable products with a low content of free formaldehyde, low molar ratios of formaldehyde to urea and having high rates of hardening, and on the other hand it is desirable to be able to vary the degree of penetration of the resin into the wood so as to be able to use types of wood which differ in their porosity. We would in fact stress that in the case of an excessive penetration of the urea-formaldehyde resin into the capillaries of the wood, the quantity of resin on the surface would be insufficient to produce an acceptable bond between the particles of wood and in the long run the manufactured products would have poor mechanical properties.

Manufactured goods with undesirable properties are also obtained when the degree of penetration of the resin into the capillaries of the wood is excessively poor. In one of our pending applications for patent there is described a continuous process for the preparation of urea-formaldehyde resins which are stable over a period of time, have low values of free formaldehyde and molar ratio of formaldehyde to urea, and which harden rapidly under the action of catalysts normally used for the purpose.

Such resins are moreover suitable for the preparation of manufactured goods such as chipboard and plywood panels.

It has now been found possible to regulate the degree of penertation of urea-formaldehyde resins so as to render them suitable for impregnation of the most widely diverse types of wood of differing porosity, at the same time improving the characteristics of such resins, particularly those concerned with the stability over a period of time and the rate of hardening.

The process of the present invention is based essentially on a continuous and stage wise conduction of the reaction of polymerisation of urea and formaldehyde, each one of the said stages involving strict control of the pH value of the medium and of the proportion among the reagents and strict control of the structural characteristics of the resin by the addition of measured quantities of methanol under conditions which will be defined in greater detail hereinafter. It has in fact been found that the addition of methanol according to the present invention makes it possible effectively to control the quantity of free methylol groups in the resin and thus definitively to control the characteristics of penetration of the resin into the capillaries of the wood.

Therefore, the process according to the present invention comprises an initial stage of polymerisation reaction which is carried out at a basic pH and with high ratios of formaldehyde to urea, a second stage of reaction in which the product originating from the first stage is maintained at a relatively acid pH for a short period of time and a third stage of reaction in which a weakly acid pH is maintained, with low ratios of formaldehyde to urea, and is essentially characterised by the fact that methanol is added to the first or to the second stage of reaction or to both stages of reaction, in quantities of 2 to 12% by weight with respect to the total reaction mass which is discharged at the final stage of the process.

More particularly, according to the process of the present invention, in the first stage of reaction, formaldehyde and urea are brought into contact in an aqueous reaction medium, molar ratios of formaldehyde to urea equal to or greater than 2:1 up to a maximum ratio of 2.7:1 being maintained.

In this stage of reaction, the pH of the reaction medium ranges from 8 to 9.5 and the temperature ranges from 60 to 95° C.

The contact times are also selected over the range of values from 15 to 50 minutes and have however to be such as to allow discharge of a product of reaction having viscosity levels of 12" to 22" measured at 25° C. in a No. 4 Ford Cup.

According to another form of embodiment of the present invention, urea and the fluid products of reaction between urea and formaldehyde, known in the art as "formurea" or "ureic syrup" are fed to the first stage of reaction. Obviously, the quantities of urea or formurea will be such as will provide a molar ratio of formaldehyde to urea equal to or greater than 2:1.

Furthermore, a basic pH still applies, together with the temperatures previously described and reaction times such that a product can be discharged which has the aforesaid characteristics of viscosity.

The reaction product originating from the first stage is then supplied continuously to the second stage of reaction where a molar ratio of formaldehyde to urea equal to that of the first stage is applied, pH values of 4 to 5.5 being maintained.

For this purpose, also formic acid is supplied to the second reaction stage, normally in the form of dilute aqueous solution.

In the second stage of reaction, the temperature is maintained within the range of values described for the first stage, the contact time being relatively short and generally from 4 to 15 minutes. According to the process of the present invention, methanol is supplied continuously to the first and second stages of reaction in quantities as previously defined.

It has in fact been found that by working over this range of concentrations it is possible to influence the quantities of free methylol in the final resin.

More particularly by expressing such methylol groups as a percentage by weight of semi-combined formaldehyde or rather in methylolated form in the final resin, the value of this property may be varied over a range of values, from approximately 8 to 25% by weight.

In this way, urea-formaldehyde resins are obtained with quantities of methylol groups varying according to the quantity of methanol used. Such resins may be used for the impregnation of wood in that it is possible to regulate the quantity of methylol groups in the resin according to the characteristic features of the wood which has to be impregnated. It is a fact well-known that the penetrability of the resins into the pores of the wood depends upon the quantity of methylol groups in the sense that this increases as the number of methylol groups increases. The product discharged from the second stage of reaction, which has a viscosity of 35" to 65" measured in the usual way is neutralised, according to an essential aspect of the present invention, so as to bring its pH to approximately neutral values prior to supply to the third reaction stage.

For this purpose, sodium hydroxide or another inorganic base is supplied to the product in the vicinity of the exit from the second stage, so that the resultant pH is approximately 6.8 to 7.5.

The product which is thus neutralised is supplied continuously to the third stage of reaction, together with a sufficient quantity of urea to ensure a molar ratio of formaldehyde to urea of 1.40:1 to 1.65:1 in the said stage.

In this stage of reaction, working temperatures are equal to those of the preceding stages while pH is maintained at between 5.7 to 6.8.

In order to maintain such pH values, formic acid is normally supplied to the third stage of reaction.

The contact times are normally comprised between 2 and 9 hours and are in any event such that a product of reaction is discharged which has a viscosity of 70" to 100" measured in the usual way.

In a preferred form of embodiment, the third stage of reaction is carried out through a plurality of phases, with decreasing values of molar ratio of formaldehyde to urea.

In practice, it is appropriate to use two reaction phases for the third stage and in the first of the said two phases to maintain a molar ratio of formaldehyde to urea of 1.65:1 to 1.80:1 and in the second to maintain a ratio of 1.40:1 to 1.65:1.

For this purpose, urea is fed to both these phases, in such a quantity that the molar ratio is brought between these said limits.

In addition, in each of the said phases, the pH of the medium and of the temperature are maintained within the range of values described for the third stage and the overall contact time must be such as will allow discharge of a product having a viscosity which falls within the aforedefined limits.

The product of reaction discharged from the third stage is cooled while the pH is brought to approximately 8 by the addition of an inorganic base, generally sodium hydroxide.

The process of the present invention, in addition to the advantages which accrue from continuity, is easily performed in that the various reaction stages are conducted in simple vessels fitted with an agitator, such as for example autoclaves.

Furthermore, urea-formaldehyde resins are obtained which have molar ratios of formaldehyde to urea as low as 1.5:1 or less, and which are exceptionally stable in course of time and which harden rapidly with normal hardeners, nothwithstanding the low content of free formaldehyde which is always less than 1% by weight.

Above all, by using the process according to the present invention, it is possible to control and vary at will, over a wide range of values, those structural characteristics of the resin which are vitally important in the production of manufactured goods such as chipboard and plywood panels of high quality.

The examples which follow are based on a urea-formaldehyde pre-condensate or formurea having the following properties.

(1) Formaldehyde content (total)  59–60%.
(2) Urea content (total) _____ 24–24.6%.
(3) Free formaldehyde (percent
    by weight) _____ 20.7–21.9.
(4) Semi-combined formaldehyde
    (percent by weight) _____ 36.6–37.4.
(5) Specific gravity at 25° C. ____ 1.320–1.326.
(6) Viscosity at 25° C. in No. 4
    Ford Cup _____ 65"–85".
(7) pH _____ 8–9.
(8) Hazen colour _____ 15 (maximum).
(9) Ash _____ 0.025% (maximum).
(10) Methanol _____ 0.07% (maximum).

Characteristics 1 and 2 are given as a percentage by weight. The free formaldehyde and that which is semi-combined in formurea were determined by the following method:

The free formaldehyde is determined by neutralising a sample of formurea and adding measured quantities of aqueous acetic acid of known titre and of saturated sodium sulphite solution.

The excess of acid is finally titrated by means of aqueous sodium hydroxide.

The semi-combined formaldehyde is determined by treatment with an excess of iodine in an alkaline medium and titrating the excess of iodine with thiosulphate. In this way, it is possible to obtain the total quantity of free formaldehyde and semi-combined formaldehyde (or formaldehyde methylolate).

By finding the difference, it is possible then to obtain the quantity of formaldehyde present in semi-combined form.

EXAMPLE 1

In a stainless steel autoclave are placed 2327.2 parts by weight of formurea, 507.2 parts by weight of water, 216.4 parts by weight of methanol and 1249.4 parts by weight of urea. The mixture is stirred and heated to 90° C. After 15 minutes, formic acid is added adjusting the pH to 5.1–5.2.

The temperature is kept at 90° C. up to a viscosity of 55" to 60" measured at 25° C. in a No. 4 Ford Cup.

Then, sodium hydroxide is added, adjusting the pH to 6.5 to 6.6 and condensation is continued at 90° C. until the viscosity is equal to 83" to 86", measured as stated above. The mixture is then cooled and the pH brought to approximately 8 by the addition of sodium hydroxide.

EXAMPLE 2

In a stainless steel autoclave are placed 2327.2 parts by weight of formurea, 507.2 parts by weight of water, 216.2 parts by weight of methyl alcohol and 798.2 parts by weight of urea. The mixture is stirred and heated to 90° C. After 15 minutes, formic acid is added, adjusting the pH to 5.1 to 5.2.

A temperature of 90° C. is maintained until viscosity is equal to 40" to 42", measured at 25° C. in a No. 4 Ford Cup and then sodium hydroxide is added bringing the pH to 7.0 to 7.5.

Then, 316.2 parts by weight of urea are added and the temperature maintained at 90° C. and the pH maintained at 6.5 to 6.6 until the viscosity is 60" to 62", measured in the usual way.

Finally, 134.6 parts by weight of urea are added and the temperature maintained at 90° C. with a pH of 6.5 to 6.6 until the viscosity becomes 83" to 86", measured in the usual way.

EXAMPLE 3

In a stainless steel reactor are placed, in a continuous process: 3765 kg./hour of formurea, 350 kg./hour of methanol and 1620 kg./hour of an aqueous solution of urea containing 71% by weight of water. A temperature equal to 85° C. is maintained in the first reactor, the contact time being approximately 31 minutes. The product emerging from the first reactor is passed continuously into a second stainless steel reactor into which are also introduced 52 kg./hour of formic acid in aqueous solution (acid concentration 5% by weight).

In a second reactor, the pH is 4.9 to 5.2 and, after a contact time of approximately 7 minutes and 48 seconds, a product is discharged with a viscosity of 40" to 44", measured in a No. 4 Ford Cup at 25° C.

This product is raised to pH 6.8 to 7.1 with 17 kg./hour of aqueous solution containing 10% by weight sodium hydroxide after which it is passed to a third stainless steel reactor together with 521 kg./hour of aqueous solution of urea (containing 71% by weight in water) and 10 kg./hour of formic acid in aqueous solution (acid concentration 5% by weight).

In this reactor, the pH is 6.1 to 6.4, the contact time is equal to approximately 65 minutes and the temperature 90° C. and a product is continuously discharged with a viscosity of 44" to 47", measured as above.

Discharged from the third reactor, the product is passed to a fourth reactor together with 704 kg./hour of an aqueous solution of urea (containing 71% by weight in water).

Conditions in the fourth reactor are: temperature 90° C., pH 6.6 to 6.8 and contact time equal to approximately 2 hours and 54 minutes and a product is continuously discharged with a viscosity of 83"–86", measured by the usual method.

17 kg./hour of aqueous sodium hydroxide (concentration of sodium hydroxide: 10% by weight) are added continuously to the product discharged and the product is allowed to cool.

EXAMPLE 4

3765 kg./hour of formurea, 486 kg./hour of methanol an 1600 kg./hour of an aqueous solution of urea containing 72.5% by weight of water are supplied continuously to a stainless steel retactor. The temperature in the first reactor is kept at 85° C. and the contact time is kept at approximately 35 minutes.

The product discharged from the first reactor is passed continuously into a second stainless steel reactor to which are also supplied 52 kg./hour of aqueous formic acid with an acid concentration equal to 5% by weight. The second reactor is kept at a pH of 4.9 to 5.2, at 96° C. and, after a contact time equal to 11 minutes, a product is discharged which has a viscosity of 40" to 42", measured at 25° C. in a No. 4 Ford Cup. This product is raised to 6.8 to 7.1 by the addition of 17 kg./hour of aqueous sodium hydroxide (10% by weight) and is then passed to a third stainless steel reactor to which are also supplied 514 kg./hour of aqueous solution of urea containing 72.5% by weight of water and 10 kg./hour of aqueous formic acid containing 5% by weight of acid.

In this reactor, the pH is 6.1 to 6.4, the contact time 1 hour and 40 minutes and the temperature 90° C., and a product is continuously discharged which has a viscosity of 44 to 47", measured as above.

The product discharged from the third reactor is passed into a fourth stainless steel reactor to which are also supplied 696 kg./hour of aqueous urea with a water content equal to 72.5% by weight. In the fourth reactor, the temperature is 90° C., the pH 6.6 to 6.8 and after a contact time of 4 hours and 10 mins., a product is dicharged which has a viscosity of 83″ to 86″, measured in the usual manner.

To the product continuously discharged are added 17 kg./hour of aqueous sodium hydroxide of 10% concentration, to bring the pH of the mass to approximately 8, and the product of reaction is cooled.

EXAMPLE 5

3765 kg./hour of formurea, 692 kg./hour of methanol and 1580 kg./hour of aqueous solution of urea containing 74% by weight of water are introduced into a stainless steel reactor. In the first reactor, a temperature equal to 85° C. is maintained and a contact time of 40 minutes is observed. The product which leaves the first reactor is passed to a second stainless steel reactor to which are also supplied 52 kg./hour of aqueous formic acid with 5% by weight of acid. The pH maintained in the second reactor is 4.9 to 5.2, the temperature 95° C. and after a contact time of 15 minutes, a product is discharged which has a viscosity of 40″ to 42″, measured at 25° C. in a No. 4 Ford Cup.

This product is brought to pH 6.8 to 7.1 by the addition of 17 kg./hour of aqueous sodium hydroxide (concentration 10% by weight) and passed to a third stainless steel reactor to which are also supplied 590 kg./hour of aqueous urea with a water content equal to 74% by weight and 10 kg./hour of formic acid at the rate of 5% by weight of acid.

In this reactor, the pH is 6.1 to 6.4, the temperature 90° C. and the contact time equal to 2 hours and 20 mintues, and a product is continuously discharged which has a viscosity of 44″–47″, measured in the usual way.

The product discharged from the third reactor is passed to a fourth stainless steel reactor together with 686 kg./hour of aqueous urea containing 74% by weight of water. In the fourth reactor, the temperature is 90° C., the pH is 6.6 to 6.8 and the contact time is 5 hours and 30 minutes and a product is continuously discharged which has a viscosity of 83″ to 86″, measured in the said manner.

To the continuously discharged product are added 17 kg./hour of 10% aqueous sodium hydroxide, and the reaction mass is cooled.

The examples 1 and 2 described are for comparison; examples 3 to 5 are conducted according to the process of the present invention. In all five examples, the molar ratio of formaldehyde to urea is equal to 1.5:1.

Table 1 lists the characteristic features of the urea-formaldehyde resins obtained in examples 1 to 5. More particularly, the table shows the following values:

(1) Viscosity: measured in a No. 4 Ford Cup at 20° C. (in secs.)
(2) pH
(3) free formaldehyde as a percentage by weight
(4) semi-combined formaldehyde as a percentage by weight
(5) compatibility in water
(6) hardening time at 60° C.
(7) percentage dry weight
(8) specific gravity at 20° C.
(9) stability in months.

The figure for free formaldehyde is determined by oxidising the said formaldehyde to formic acid by hydrogen peroxide neutralising the said acid with aqueous sodium hydroxide in excess and finally titrating the excess of sodium hydroxide.

The figures for semi-combined formaldehyde is determined in a manner similar to that described for formurea.

Water compatibility is determined by placing in a 100-ml. Nessler tube 40 ml. of the resin under investigation, diluted with water to 50%. Small portions of distilled water are added at 25° C., until the mixture becomes clouded.

Compatibility in water is thus expressed as parts by volume of liquid resin to parts by volume of water. The hardening time is determined by adding to 100 g. of resin 10 ml. of a solution comprising urea (5 parts by weight), ammonium chloride (5 parts by weight) and water (90 parts by weight). The homogenised mixture is added to a vessel which is thermostatically controlled at 60° C. and the hardening time is regarded as the period which elapses between introduction of the mixture into the thermostatically controlled medium until gelling of the mass occurs.

The stability in months is determined by maintaining a specimen of 500 g. of resin at 20° C. and by monitoring the viscosity in relation to time.

When the viscosity in a No. 4 Ford Cup at 25° C. exceeds a level of 300 seconds, the product is regarded as unusable.

The time elapsing prior to attaining a viscosity of 300 seconds, expressed in months, is the stability time.

Table 2 shows the values of the characteristic features of chipboard panels obtained by using the urea-formaldehyde resins of examples 1 to 5.

The chipboard panels are prepared in the following way.
A mixture is prepared from:

| | Parts by weight |
|---|---|
| Urea-formaldehyde resin | 100 |
| Water | 20–30 |
| Ammonium chloride | 1 |

The mixture is sprayed onto wood chips which have been previously dried so that the weight ratio of wood to dry resin is equal to 100:10. From the resin-treated chips, a mat is prepared by settlement and this mat, conveyed on a belt, is first pressed cold under 15 to 30 kg./sq. cm. pressure and is then introduced into a multi-level press in which, by the effect of the heat (150 to 170° C.) and the pressure (25 to 30 kg./sq. cm.), the resin becomes polymerised and the chipboard panel is consequently formed.

When extracted from the press, the panel is conditioned at room temperature and finally squared off and smoothed. The following characteristic features are then determined with respect to chipboard panels which are thus prepared:

(1) bending strength, to DIN 52362 standards
(2) transverse tensile strength in kg./sq. cm., according to DIN 53365 standards
(3) apparent density in g./cu. cm. according to DIN 52361 standards
(4) swelling in water (as percentage by weight) after 2 hours at 20° C., according to DIN 52364 standards
(5) swelling in water (as percentage by weight) after 24 hours at 20° C., according to DIN 52364 standards
(6) green cohesion. This property is evaluated by resin-treating poplar chips in a suitable resin applicator, to produce:
dry resin in terms of dry chips (percentage by weight)=10
moisture content of the chips (percentage by weight) with respect to dry chips=13±2.

Normally a mat is formed measuring 30 x 40 cm. using 1 kg. of resin-treated chips. It is then pressed cold for 10 secs. at 22 kg./sq. cm. The green cohesion is assessed manually as a function of the consistency of the panel according to the following scale which has the extreme values:

| | |
|---|---|
| Highly consistent | 500 |
| Poor consistency | 600 |

Table 3 shows the figures for plywoods obtained by using the urea-formaldehyde resins according to examples 1 to 5. In particular, the plywoods are obtained as follows:

A mixture is made up consisting of:

| | Parts by weight |
|---|---|
| Urea-formaldehyde resin | 100 |
| Water | 50–70 |
| Organic flours | 40–50 |
| Ammonium chloride | 1 |

This mixture is applied with a roller spreader, on previously dried rolled-out or cut wood at the rate of 180 to 230 g. of every sq. m. of area. The next stage is the formation of an assembly of rolled-out or cut panels which are superimposed in an odd number, their fibres intersecting at an angle of 90°.

The assembly is then subjected to the action of a press wherein, by the effect of heat (approximately 100° C.) and pressure (7 to 12 kg./sq. cm.), the resin becomes polymerised and the plywood is thus formed. When removed from the press, the plywood is conditioned at room temperature and is finally squared off and smoothed.

The following tests are then conducted on the plywood:

(1) knife test
(2) resistance to cutting by traction in kg./sq. cm.
(3) percentage of fibres remaining.

These three tests are carried out according to British standards 1455—1963 and are listed in Table 3.

Table 4 shows the same characteristics as in Table 2, recorded on the plywood after it has been immersed in water at approximately 20° C. for 16 to 24 hours (British standard 1455—1963).

TABLE 1.—RESIN

| Characteristics | Ex. 1 | Ex. 2 | Ex. 3 | Ex. 4 | Ex. 5 |
|---|---|---|---|---|---|
| Viscosity | 110 | 110 | 120 | 125 | 125 |
| pH | 8.2 | 8.3 | 8.0 | 8.1 | 8.2 |
| Free formaldehyde | 1.5 | 1.0 | 0.8 | 0.6 | 0.4 |
| Semi-combined formaldehyde | 14.5 | 14.3 | 14 | 12 | 10 |
| Compatibility in water | 1:0.3 | 1:2 | 1:2.5 | 1:3 | 1:3.5 |
| Hardening time | 7'38" | 12'9" | 10' | 22' | 38' |
| Dry | 65.5 | 66.2 | 66.2 | 66.0 | 66.1 |
| Specific gravity | 1,270 | 1,270 | 1,270 | 1,265 | 1,260 |
| Stability | <1.5 | 4 | 5 | 6 | 7 |

TABLE 3.—PLYWOOD

| Characteristics | Ex. 1 | Ex. 2 | Ex. 3 | Ex. 4 | Ex. 5 |
|---|---|---|---|---|---|
| Knife test | 5–6 | 7 | 7 | 7 | 7 |
| Resistance to cutting by traction (kg./sq. cm.) | 18.2 | 19.1 | 22 | 21.8 | 22 |
| Percentage fibres remaining | 80 | 65 | 90 | 85 | 50 |

TABLE 2.—CHIPBOARD PANEL

| Characteristics | Ex. 1 | Ex. 2 | Ex. 3 | Ex. 4 | Ex. 5 |
|---|---|---|---|---|---|
| Bending strength | 197 | 228 | 242 | 245 | 248 |
| Transverse tensile strength | 3.7 | 4.2 | 4.3 | 4.3 | 4.4 |
| Apparent density | 0.75 | 0.73 | 0.73 | 0.73 | 0.73 |
| Swelling in water (2 hours) | 13.9 | 13.3 | 11.5 | 11 | 11 |
| Swelling in water (24 hours) | 18.2 | 15.5 | 14.5 | 14.2 | 14.0 |
| Green cohesion | 540 | 540 | 535 | 530 | 520 |

TABLE 4.—PLYWOOD

| Characteristics | Ex. 1 | Ex. 2 | Ex. 3 | Ex. 4 | Ex. 5 |
|---|---|---|---|---|---|
| Knife test | 0 | 0 | 0 | 0 | 0 |
| Resistance to cutting by traction (kg./sq. cm.) | 9 | 11.6 | 12 | 13 | 12.4 |
| Percentage fibres remaining | 70 | 40 | 50 | 50 | 45 |

What we claim is:

1. Process for the continuous preparation of urea-formaldehyde resins in a series of stages and by the successive addition of urea in several stages, characterised by, in a first reaction stage, the supply of urea and formaldehyde in molar ratios of 2:1 to 2.7:1 and by carrying out the said stage at temperatures of 60 to 95° C. with a pH of 8 to 9.5 in the aqueous reaction medium and with a contact time of 15 to 50 minutes;

by the product emanating from the first stage being supplied to a second reaction stage together with formic acid and in that the said second stage is performed at temperatures of 60 to 95° C. with a pH of 4 to 5.5 in the aqueous reaction medium, the contact time being 4 to 15 minutes;

by methanol being supplied to the first and/or to the second stage of reaction in quantities of 2 to 12% by weight with respect to the product discharged from the final stage of reaction;

by the product discharged from the second stage being neutralised to a pH of 6.8 to 7.5, the said neutralised product being fed to a third reaction stage together with urea, and the said third stage being carried out with molar ratios of formaldehyde to urea of 1.40:1 to 1.65:1, at temperatures of 60 to 95° C., with a pH of 5.7 to 6.8 in the aqueous reaction medium and with a contact time of 2 to 9 hrs.

by the urea-formaldehyde resin discharged from the third stage being cooled and its pH brought to approximately 8.

2. Process according to Claim 1, characterised in that in the first reaction stage, the formaldehyde is supplied with part of the urea in the form of formurea.

3. Process according to Claim 1, characterised in that in the third stage of reaction, two successive working phases are employed, the first of the said phases being conducted with a molar ratio of formaldehyde to urea of 1.65:1 to 1.80:1, the second of the said phases being carried out with a molar ratio of formaldehyde to urea of 1.40:1 to 1.65:1.

4. Process according to Claim 1, characterised in that from the first stage of reaction a product is discharged which has a viscosity of 12" to 22", measured at 25° C. in a No. 4 Ford Cup.

5. Process according to Claim 1, characterised in that from the second stage of reaction a product is discharged which has a viscosity of 35" to 65", measured at 25° C. in a No. 4 Ford Cup.

6. Process according to Claim 1, characterised in that from the third stage of reaction a product is discharged which has a viscosity of 70" to 100", measured at 25° C. in a No. 4 Ford Cup.

References Cited

UNITED STATES PATENTS 2,377,422   6/1945   Hodgins et al. _____ 260—70 A

HOWARD E. SCHAIN, Primary Examiner

U.S. Cl. X.R.

161—261; 260—29.4 R